T. IUCHI.
ROTATABLE SCALE.
APPLICATION FILED FEB. 25, 1919.
1,307,585.
Patented June 24, 1919.
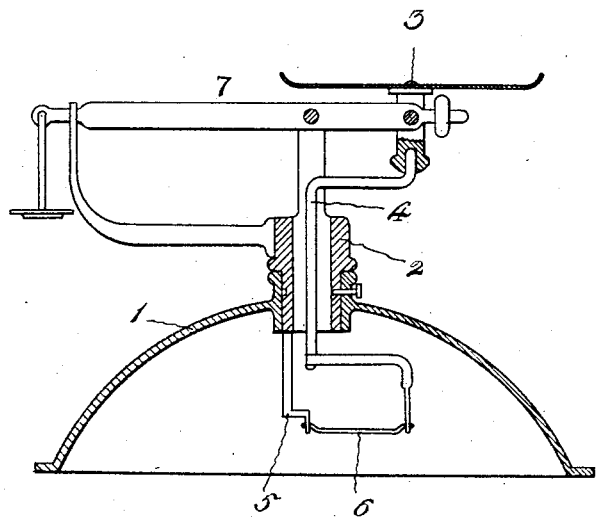
Inventor
Tahei Iuchi,
By B. Singer,
Attorney

UNITED STATES PATENT OFFICE.

TAHEI IUCHI, OF TOKUSHIMA, JAPAN.

ROTATABLE SCALE.

1,307,585.  Specification of Letters Patent.  Patented June 24, 1919.

Application filed February 25, 1919. Serial No. 279,127.

*To all whom it may concern:*

Be it known that I, TAHEI IUCHI, merchant, a subject of the Emperor of Japan, residing at No. 13 Nishi-Shinmachi, city of Tokushima, Empire of Japan, have invented Improvements in Rotatable Scales, of which the following is a specification.

This invention relates to an improvement in weighing scales whereby the graduated beam together with receiving pan and other connecting parts are all made rotated so that the position of the pan may be varied to get out of the way of surrounding objects, while at the same time to facilitate the reading of the graduation from any direction.

Further object of the invention is to provide a scale of the character described wherein the scale-pedestal is utilized to receive within its hollow empty space a portion of the counterpoising mechanism so that the same may be easily handled and manipulated in transportation and stowage without damage.

It consists in providing upon the scale-pedestal a supporting sleeve adapted to rotate with all its mountings and connecting parts including graduated beam, receiving pan, in order to suit the direction from which the light comes.

It consists, further, in placing the portion of the counterpoising mechanism within the hollow space of the pedestal so that the latter may be utilized to serve as a protector of the counterpoising mechanism.

The accompanying drawing illustrates my improved scale, shown in side elevation, longitudinally sectioned.

In this drawing the scale-pedestal which is shown in the usual inverted bowl-like shape is designated by reference numeral 1, the central portion of which is mounted by a rotatable sleeve 2. 7 is a scale-beam adapted to rotate in the fulcrum lying in the vertical axis of the sleeve 2. 3 is a receiving pan, underneath of which the guiding arm 4 which is bent to the form of the crank descends through the bore of the sleeve into the hollow empty space of the pedestal. From the lower end of the rotating sleeve descends a short arm 5 adapted to join lower end of the cranked guiding arm 4 by means of a suitable wire 6, all as clearly illustrated.

Having described my invention what I claim is:—

1. A weighing scale comprising a hollow pedestal, a sleeve member rotatably mounted upon the said pedestal, a counterpoising beam mounted on the sleeve and guiding means extending through the bore of the said rotating sleeve and terminating into the hollow space of the pedestal, substantially as set forth and illustrated.

2. A weighing scale comprising a hollow pedestal, a sleeve member rotatably mounted upon said pedestal, a counterpoising beam mounted on the sleeve, a scale pan pivotally mounted on the beam, a cranked guiding rod connected to the scale pan and extending down through the bore of the sleeve into the hollow pedestal, and connecting means between the lower end of said guide arm and the sleeve, said connecting means being also arranged in the hollow pedestal.

In testimony whereof I affix my signature in presence of two witnesses.

TAHEI IUCHI.

Witnesses:
 W. EHIHARAH,
 T. KOTANI.

Copies of this patent may be obtained for five cents each, by addressing the "Commissioner of Patents, Washington, D. C."